United States Patent
Danielson et al.

(10) Patent No.: US 8,695,642 B2
(45) Date of Patent: Apr. 15, 2014

(54) REFRIGERATION VALVE BLOCK

(75) Inventors: Robert Danielson, Ham Lake, MN (US); Stanlee Meisinger, North Port, FL (US)

(73) Assignee: FasTest, Inc., Roseville, MN (US)

( * ) Notice: Subject to any disclaimer, the term of this patent is extended or adjusted under 35 U.S.C. 154(b) by 445 days.

(21) Appl. No.: 12/985,598

(22) Filed: Jan. 6, 2011

(65) Prior Publication Data
US 2011/0186160 A1 Aug. 4, 2011

Related U.S. Application Data (60) Provisional application No. 61/299,425, filed on Jan. 29, 2010.

(51) Int. Cl.
*F16K 11/22* (2006.01)

(52) U.S. Cl.
USPC ............................................. 137/881; 62/292

(58) Field of Classification Search
USPC ............................................. 137/881; 62/292
See application file for complete search history.

(56) References Cited

U.S. PATENT DOCUMENTS

| | | | | |
|---|---|---|---|---|
| 2,549,075 A | * | 4/1951 | Fox ............................... | 137/223 |
| 3,645,496 A | * | 2/1972 | Rawlins ........................ | 251/148 |
| 4,184,661 A | * | 1/1980 | Kushner et al. ................. | 251/82 |
| 4,644,973 A | * | 2/1987 | Itoh et al. ....................... | 137/883 |
| 5,183,078 A | * | 2/1993 | Sorrell ........................... | 137/883 |
| 5,396,774 A | * | 3/1995 | Hubbell, Jr. ....................... | 62/77 |
| 6,041,818 A | | 3/2000 | Schadewald et al. | |
| 6,050,295 A | * | 4/2000 | Meisinger et al. ............. | 137/541 |
| 6,269,840 B1 | * | 8/2001 | Beaver ........................ | 137/637.4 |
| 6,901,947 B2 | | 6/2005 | Danielson et al. | |

FOREIGN PATENT DOCUMENTS

| | | |
|---|---|---|
| EP | 0 648 962 | 10/1994 |
| EP | 1 619 431 | 1/2006 |
| JP | 2001-505986 | 5/2001 |
| KR | 1998-057094 | 10/1998 |

* cited by examiner

*Primary Examiner* — John Fox
(74) *Attorney, Agent, or Firm* — Hamre, Schumann, Mueller & Larson, P.C.

(57) ABSTRACT

A service valve assembly that is designed to minimize leakage by reducing the number of leakage paths from the valve assembly. In addition, the service valve assembly is designed to permit connection to many different refrigeration systems and has higher flow capacity. The valve assembly is engageable by current servicing tools so that purchase of new service tools is not required. In the valve assembly, the service connection is designed as part of the shut-off valve and communicates with the condenser side port. Therefore, initial processing through the condenser side port and subsequent processing through the evaporation side port occur through the combined service connection and shut-off valve structure. Once installed, the described valve assembly has one leak path versus two leak paths in known valve assemblies.

24 Claims, 11 Drawing Sheets

REFRIGERATION VALVE BLOCK

This application claims the benefit of U.S. Provisional Application Ser. No. 61/299,425 filed on Jan. 29, 2010, the entire contents of which are incorporated herein by reference.

FIELD

A service valve assembly is described for use in a refrigeration system that includes a condenser unit and an evaporation unit located away from the condenser unit.

BACKGROUND

In certain refrigeration systems, for example a split system air conditioning unit, a service valve assembly is used to provide access to various parts of the system during manufacture as well as after installation of the system. A split system air conditioning unit is a unit that has the condenser unit mounted in a different location than the evaporation unit. The central air conditioning system in most homes is an example of a split system, with the condenser unit located outside of the home, and the evaporation unit located in the furnace.

Figure 1:
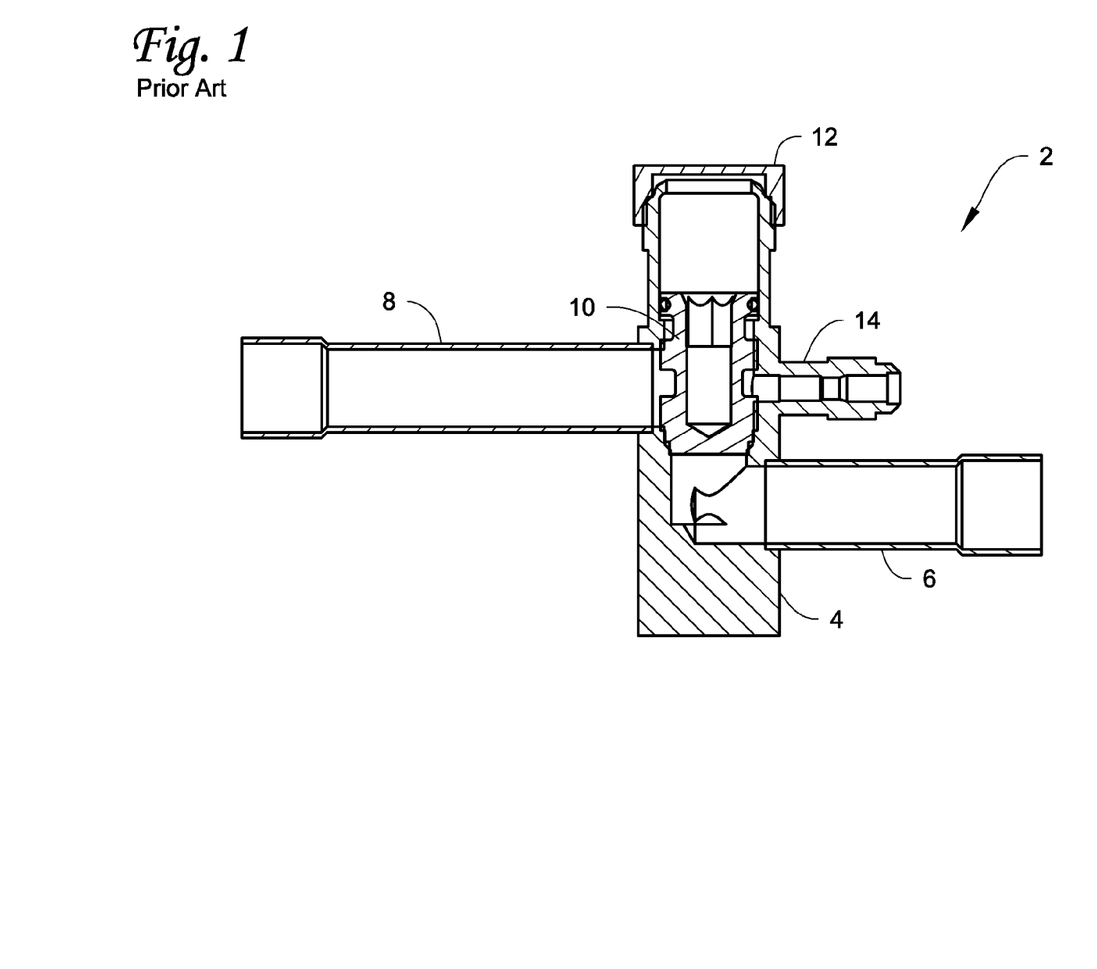
FIG. 1 illustrates a conventional service valve assembly.

FIG. 1 illustrates a conventional service valve assembly 2 that has a housing 4, a condenser side port 6, and an evaporation side port 8. A piston 10 is disposed inside the housing and is used to isolate the condenser side of the refrigeration system or allow a flow path between the evaporation side and the condenser side. A removable cap 12 is secured to the housing 4 and is removed to provide access to the piston 10 so the piston can be rotated to change the position of the piston in the housing between the isolation position shown in FIG. 1 to a position permitting flow between the evaporation side and the condenser side. An access valve 14 provides access to the interior of the housing 4 for use in servicing the refrigeration system to which the assembly 2 is connected.

In typical use, the condenser side port 6 of the valve assembly 2 is connected to the condenser unit at the factory. The piston 10 is actuated outward to provide a flow path between the evaporation side and the condenser side. The manufacturer will attach to the evaporation side port 8 using suitable tooling and test for leaks, evacuate the system of air/contaminants, and charge with refrigerant. The piston 10 is then closed to isolate the condenser side and the tooling is removed. Processing can occur through the access valve 14, but it is more typical to process through the evaporation side port 8. Once the system is ready for installation, the evaporation side port 8 is connected to the evaporation coil. The installer and downstream service personnel can then attach servicing tools to the access valve 14 to evacuate the system or perform other servicing functions, and the piston 10 opened again to allow the flow of refrigerant between the condenser and evaporator side.

SUMMARY

A service valve assembly is described that is designed to minimize leakage by reducing the number of leakage paths from the valve assembly. In addition, the service valve assembly is designed to permit connection to many different refrigeration systems and has higher flow capacity. The valve assembly is engageable by current field tools so that purchase of new service tools is not required.

In the described valve assembly, the service connection is designed as part of the shut-off valve and has a default configuration that communicates with the condenser side port. Therefore, initial processing through the condenser side port and subsequent processing through the evaporation side port occur through the combined service connection and shut-off valve structure. Once installed, the described valve assembly has one leak path versus two leak paths in the valve assembly shown in FIG. 1.

In one embodiment, a service valve assembly is provided for a refrigeration system that includes a condenser unit and an evaporation unit. The valve assembly includes a housing having a passageway, a condenser side port in communication with the passageway for connection to the condenser unit, an evaporation side port in communication with the passageway for connection to the evaporation unit, and a service port in communication with the passageway. A valve unit is disposed within the passageway of the housing. The valve unit includes a shut-off valve and a control valve, where the shut-off valve controls flow through the housing and has a first position that permits flow communication between the condenser side port and the service port, and a second position that prevents flow communication between the condenser side port and the evaporation side port and the service port but permits flow communication between the evaporation side port and the service port. The control valve controls flow through the service port and has a first position preventing flow past the control valve and thereby preventing flow through the service port, and a second position that permits flow past the control valve and thereby permits flow through the service port.

DETAILED DESCRIPTION

Figure 2:
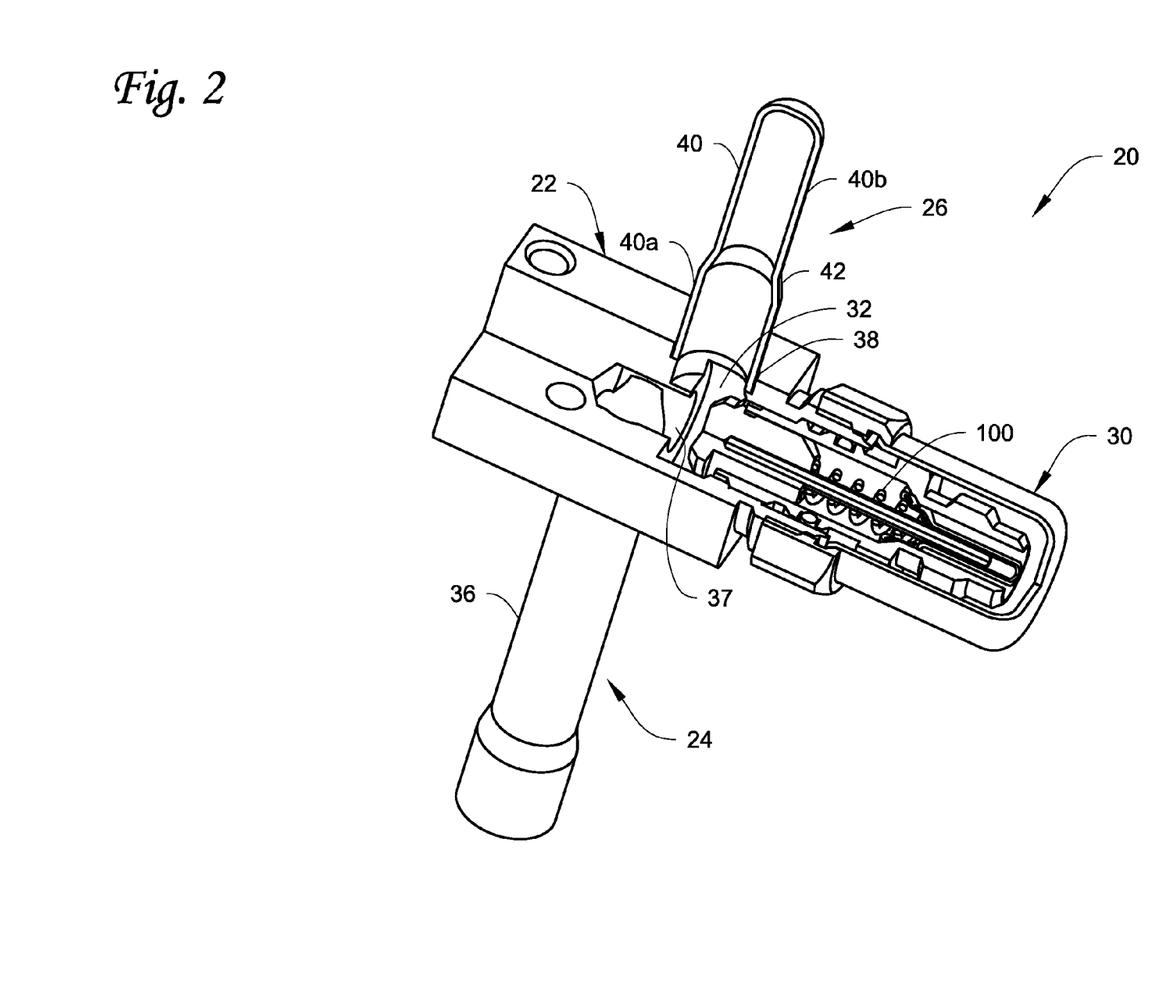
FIG. 2 is a perspective, partial cross-sectional view of the service valve assembly described in the detailed description.
Figure 3:
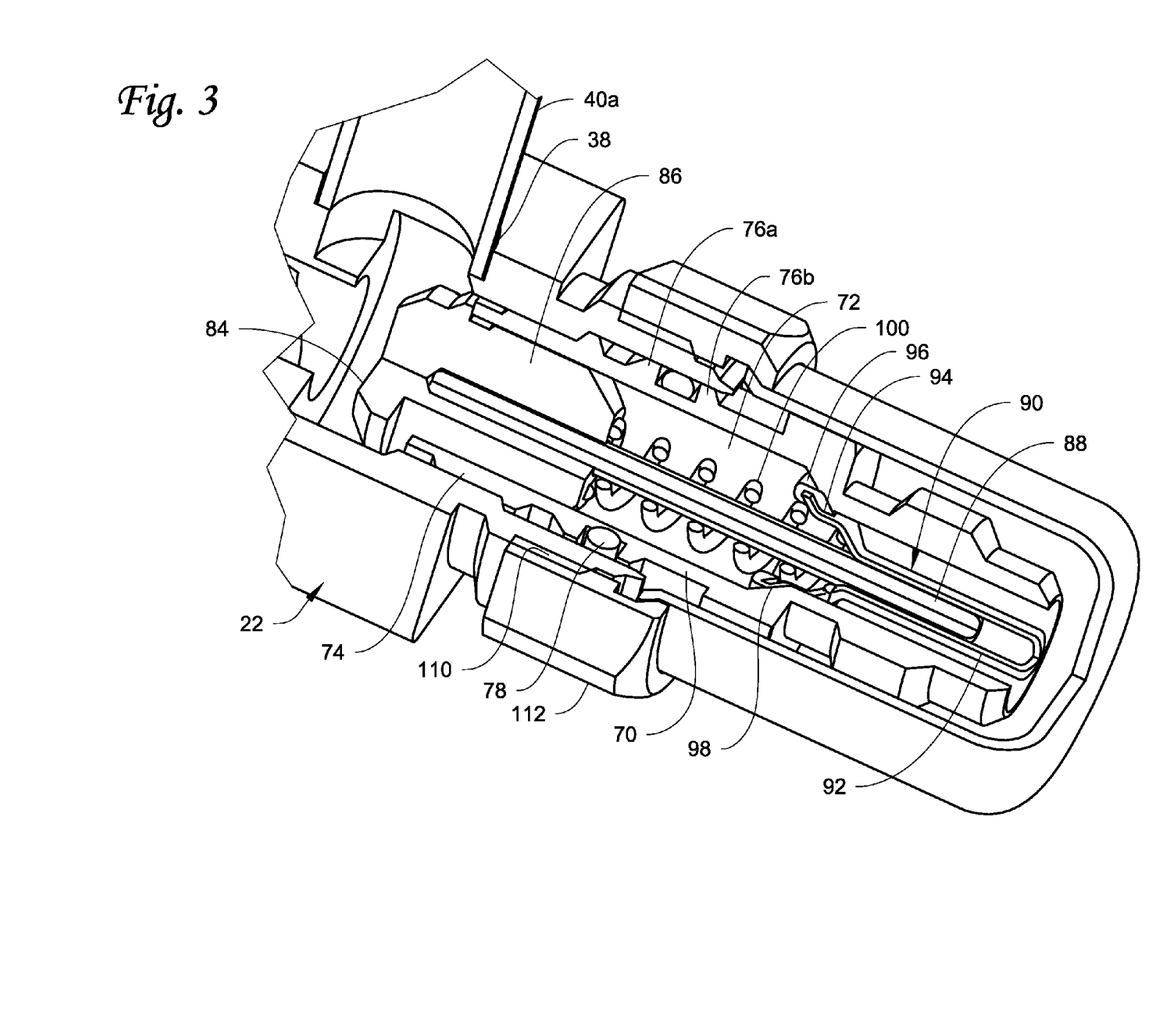
FIG. 3 is a close-up view of a portion of the service valve assembly shown in FIG. 2.
Figure 4:
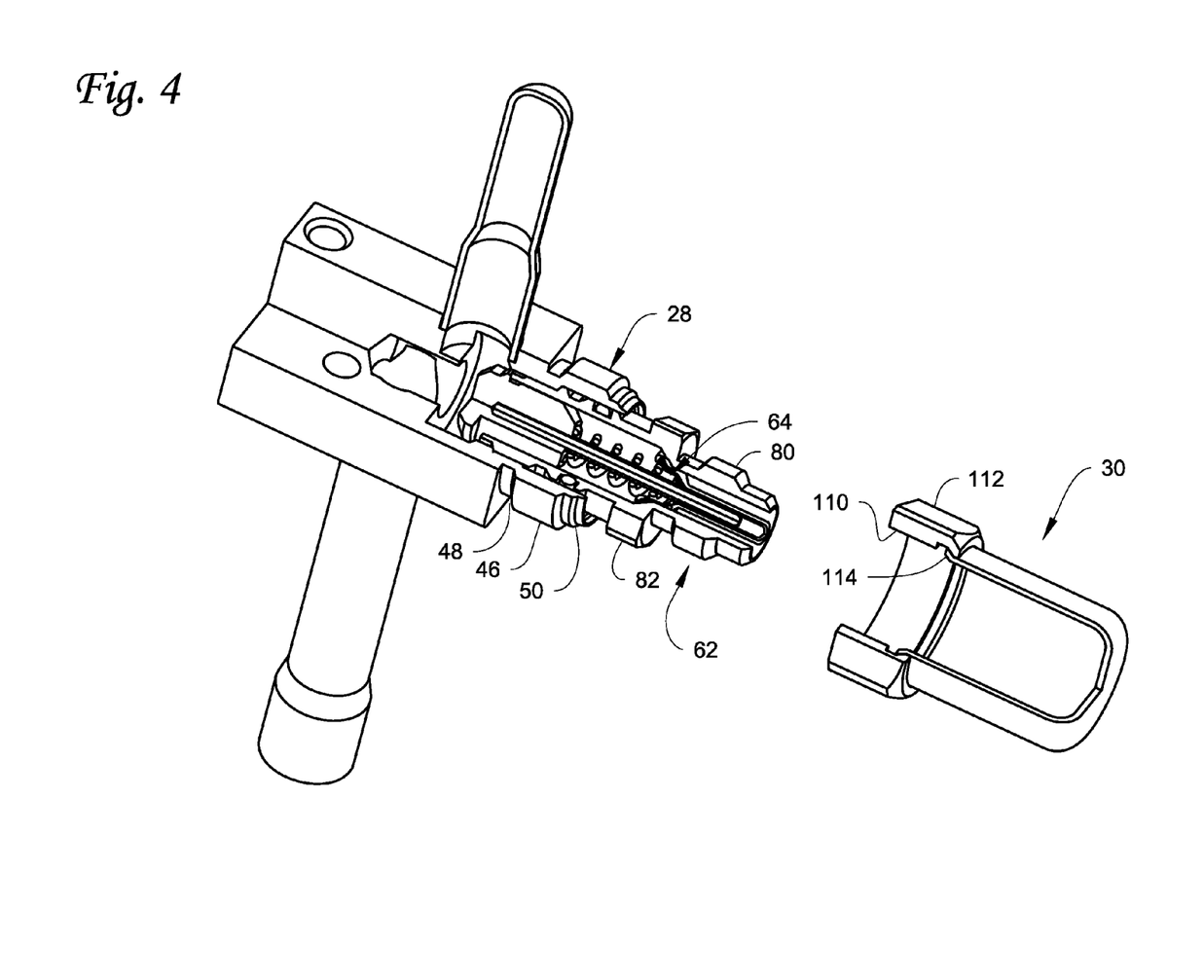
FIG. 4 is a view similar to FIG. 2 but with the cap removed.

With reference initially to FIGS. 2-4, a service valve assembly 20 that incorporates the concepts described herein is illustrated. The service valve assembly 20 will be described in this application as being used in a split system refrigeration unit that includes a condenser unit mounted in a separate location that the evaporation unit. Examples of refrigeration systems in which the concepts described herein can be used include, but are not limited to, an air conditioning system or a refrigerator for foodstuffs. The concepts described herein can be used on other types of split systems as well.

The service valve assembly 20 includes a housing 22 having a condenser side port 24, an evaporation side port 26, a service port 28 and a cap 30 that is removably disposable over the service port. The components of the service valve assembly 20 can be made primarily of metal or a metal alloy, for example bronze, that is compatible with the fluid used in the refrigeration system incorporating the service valve assembly, although other materials, including plastics for some of the components, could be used if it is determined that the material used is compatible with the refrigeration system fluid.

The housing 22 is illustrated as being generally rectangular in shape and having a fluid passageway 32 formed therein. The fluid passageway 32 is a generally hollowed-out internal section of the housing.

The condenser side port 24 comprises an opening 34 (visible in FIG. 5) formed in one of the side walls of the housing 22 that communicates with the fluid passageway 32, and a tube 36 that has a first end that is brazed, welded or otherwise secured into the opening 34 and projects from the housing to a second, opposite end. In use of the service valve assembly 20, the condenser side port 24, in particular the second end of the tube 36, is connected to a condenser unit of the refrigeration system at the factory. Within the housing 22 is a flow port 37 that places the condenser side port 24 in communication with the passageway 32.

The evaporation side port 26 comprises an opening 38 formed in a side wall of the housing 22 opposite the side wall containing the opening 34 and that communicates with the fluid passageway 32, and a tube 40 that has a first end that is brazed, welded or otherwise secured into the opening 38 and projects from the housing to a second, opposite end. The longitudinal axis of the tube 36 is illustrated as being substantially parallel to the longitudinal axis of the tube 40, with the axes of the tubes 36, 40 being offset from one another along the length of the housing 22. The tubes 36, 40 could also have other orientations, for example the axes of the tubes could be aligned (i.e. inline) with no offset. In use of the service valve assembly, the evaporation side port, in particular the second end of the tube 40, is connected to an evaporation unit of the refrigeration system when the service valve assembly is fully installed.

The second end of the tube 40 is illustrated as being closed so that fluid cannot escape through the second end of the tube 40 until the closure is removed. The closure can be integrally formed with the tube 40 as in the illustrated example, or the closure can comprise a temporary blockage means removably installed in the tube such as a brazed cap or a sealed plug. The tube 40 is also illustrated as having at least one step 42, or multiple steps, so that the tube 40 has sections 40a, 40b of different diameters, with the diameter of section 40b being less than the diameter of section 40a. In another configuration, the tube 40 could be configured to have steps that increase in size such that section 40b would be larger than section 40a. The use of one or more steps on the tube 40 provides different tube diameters, allowing the tube to be cut at the appropriate tube diameter during installation for connection with the evaporation unit. Therefore, the tube 40 can fit many different systems.

Figure 5:
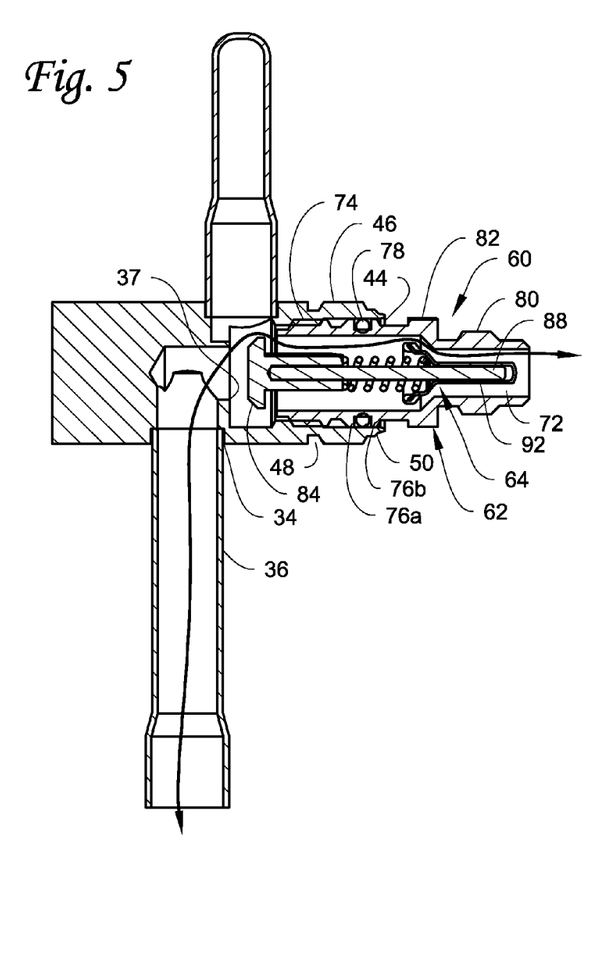
FIG. 5 is a cross-sectional view of the service valve assembly of FIG. 2 with the shut-off valve open and the control valve open to the condenser side.

With reference to FIGS. 4 and 5, the service port 28 comprises an opening 44 formed through an end of the housing 22 and that communicates with the fluid passageway 32. The exterior surface of the service port is provided with a threaded section 46, an annular groove 48, and a cap sealing surface 50.

A valve unit 60 is disposed within the service port 28 and the passageway 32 of the housing, and projects from the housing. The valve unit 60 controls flow through the housing 22 by controlling flow between the condenser side port 24, the service port 28, and the evaporation side port 26, as well as controlling flow through the service port. To accomplish these tasks, the valve unit 60 includes a shut-off valve 62 and a control valve 64.

As shown in FIG. 3-5, the shut-off valve 62 is in the form of a piston valve with a piston body 70 having one end disposed within the service port 28 and a second end extending from the housing. The piston body 70 is generally cylindrical and includes a central passageway 72 extending from one end to the other end.

The exterior of the piston body 70 includes a first threaded section 74 that engages with internal threads formed on the inside of the service port 28. The threaded section 74 permits the piston body to be screwed in and out of the service port, thereby adjusting the position of the piston body depending upon the desired flow path. A sealing groove formed between two shoulders 76a, 76b is also formed in the exterior of the piston body 70, and a seal 78 is disposed in the sealing groove. The seal 78 seals with the interior surface of the service port to prevent fluid leaks past the piston body.

The portion of the piston body 70 that extends from the housing includes a second threaded section 80 for connection with a standard service connection tool, and a hex surface 82 for engagement with a tool for rotating the piston body 70 to adjust the position thereof.

The piston body 70 also includes a piston head 84 that extends from the first end thereof and which is fixed to the piston body via circumferentially spaced standoffs 86 (best seen in FIG. 3) that extend from the piston head to the interior of the piston body. The piston head 84 moves with the piston body 70 as the piston body 70 is actuated into and from the service port. Gaps are defined between the standoffs 86 and the head 84 is spaced from the end of the piston body 70 to define a flow path (shown by the line in FIG. 5) past the piston head to and from the central passageway 72.

A stem 88 is placed with the piston head 84 and extends within the central passageway 72 toward the second end of the piston body 70. The control valve 64 comprises a poppet 90 with a sleeve 92 that is disposed over and is slideable on the end of the stem 88 and a poppet head 94 having a diameter greater than the diameter of the sleeve 92. An elastomeric seal 96 is fixed to the poppet head 94 for sealing engagement with a sealing surface 98 on the inside of the piston body 70 formed by a reduced diameter section of the passageway 72.

A coil spring 100 is disposed around the stem 88 and has one end engaged with the ends of the stand-offs 86 and a second end engaged with the poppet head 94. The spring 100 normally biases the poppet head 94 into sealing engagement with the sealing surface 98 as shown in FIG. 3 preventing fluid flow through the passageway 72 and through the piston body 70. In this position, there is a gap between the end of the stem 88 and the end of the sleeve 92. This permits the poppet 90 to be actuated to the left in FIG. 3 by a pin or other suitable projection on a service connection tool, to an open position shown in FIG. 5 where the poppet head 94 is unseated from the sealing surface 98, allowing fluid flow through the piston body.

Returning to FIGS. 2-4, the cap 30 has internal threads 110 that engage with the threaded section 46 for securing the cap 30 over the service port 28. A hex surface 112 facilitates installation and removal of the cap 30 using a suitable tool or by hand. The interior of the cap 30 also includes a sealing surface 114 that forms a metal-to-metal seal with the cap sealing surface 50 when the cap is fully installed.

Use and operation of the service valve assembly 20 will now be described with reference to FIGS. 2-4 along with FIGS. 5-9. The service valve assembly 20, with or without the cap installed, would be provided. At this time, the second end of the tube 40 is closed as shown in FIGS. 2 and 4, and the poppet 90 is biased by the spring to a first, closed position.

The condenser side port 24 is then connected to the condenser side of the refrigeration system by attaching the tube 36 to the condenser unit. The cap, if present, is also removed. If not already in position, the piston body 70 is actuated to a first position shown in FIG. 5 which provides flow communication between the condenser side port and the service port.

Suitable process tooling known in the art is then connected to the service port. This actuates the poppet 90 to a second position shown in FIG. 5 which opens a flow path past the control valve and thereby permits flow through the service port with the condenser side as shown by the flow path line.

Figure 6:
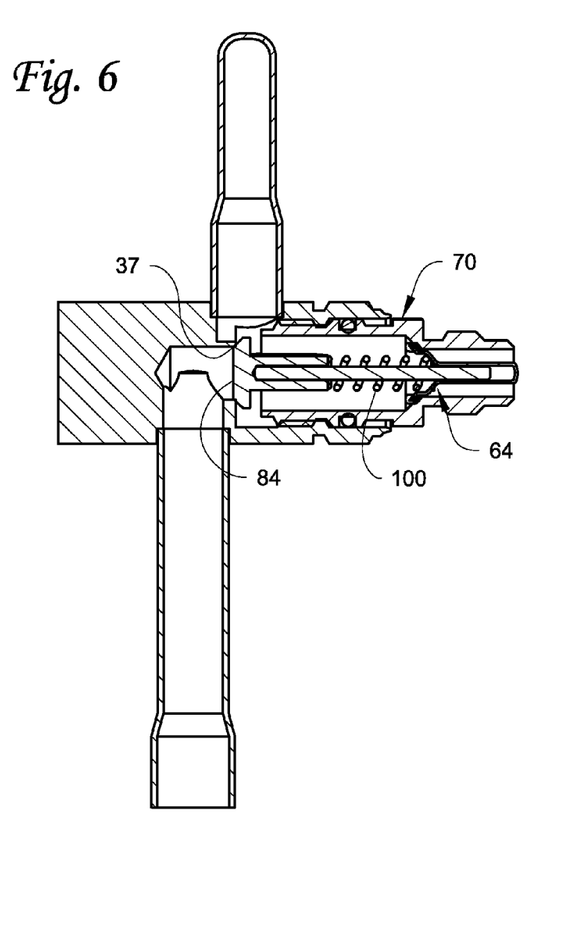
FIG. 6 is a view similar to FIG. 5 but with the shut-off valve closed and the control valve closed.

Once the processing of the condenser side is completed, the process tooling is removed and the poppet will be biased back to the closed position by the spring. The piston body 70 is then actuated into the housing 22 by rotating the piston body 70, until the piston head 84 reaches a second position where the piston head engages and seals with the flow port 37 as shown in FIG. 6. The piston head and the flow port form a metal-to-metal seal that hermetically seals the system by preventing flow communication between the condenser side port and the evaporation side port and the service port. However, flow communication between the evaporation side port and the service port is permitted. Installing the cap 30 adds a secondary seal via the metal-to-metal seal of the surfaces 50, 114 to provide a leak-proof system.

At this point, the condenser unit and attached service valve assembly 20 are stored and/or shipped for installation. During this delay period, fluid leakage tends to be the biggest concern which is prevented by the seals discussed above.

Figure 7:
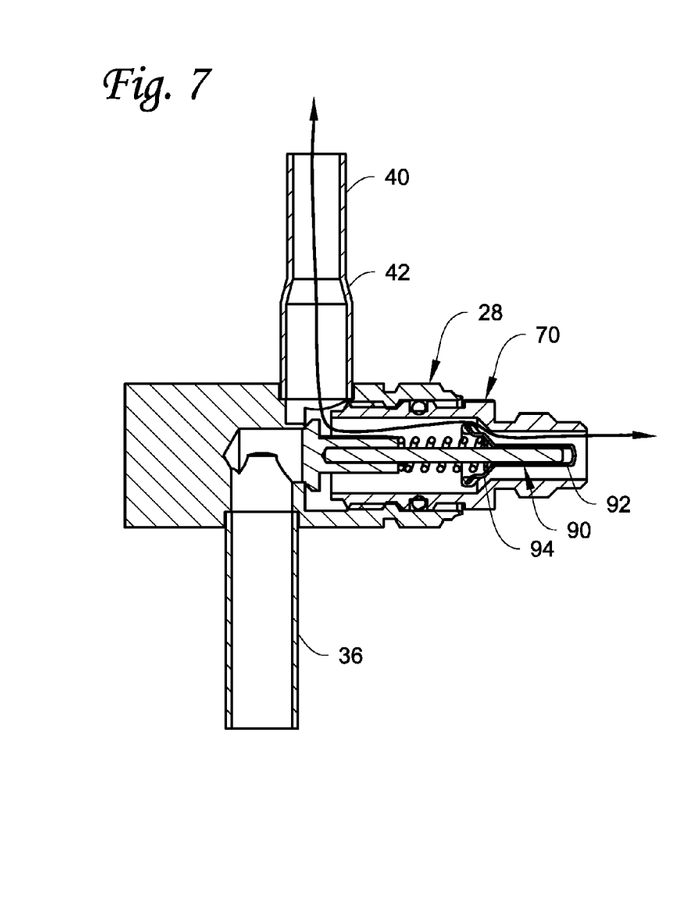
FIG. 7 is a view similar to FIG. 6 but with the control valve opened.

When the condenser unit is ready for installation, the installer will cut-off the tube 40 at a diameter that is appropriate for the system as shown in FIG. 7. Because of the steps 42, one tube 40 can fit many different systems. Alternatively, the removable plug is removed from the tube 40. The now open end of the tube is attached to the evaporation side of the refrigeration system. The installer then connects to the service port 28 of the valve assembly 20 using a standard service connection tool. This opens the poppet as shown in FIG. 7, and the installer processes the evaporation side of the system via the illustrated flow path. Once processing is complete, the service connection tool is removed, and the poppet is biased back to the closed position.

Figure 8:
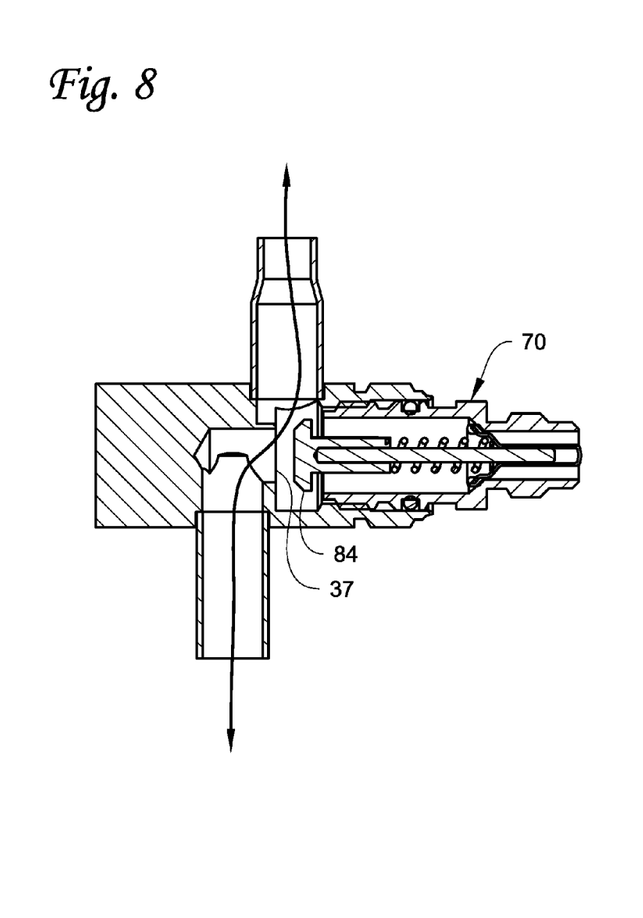
FIG. 8 is a view similar to FIG. 5 showing a flow path between the condenser side port and the evaporation side port.
Figure 9:
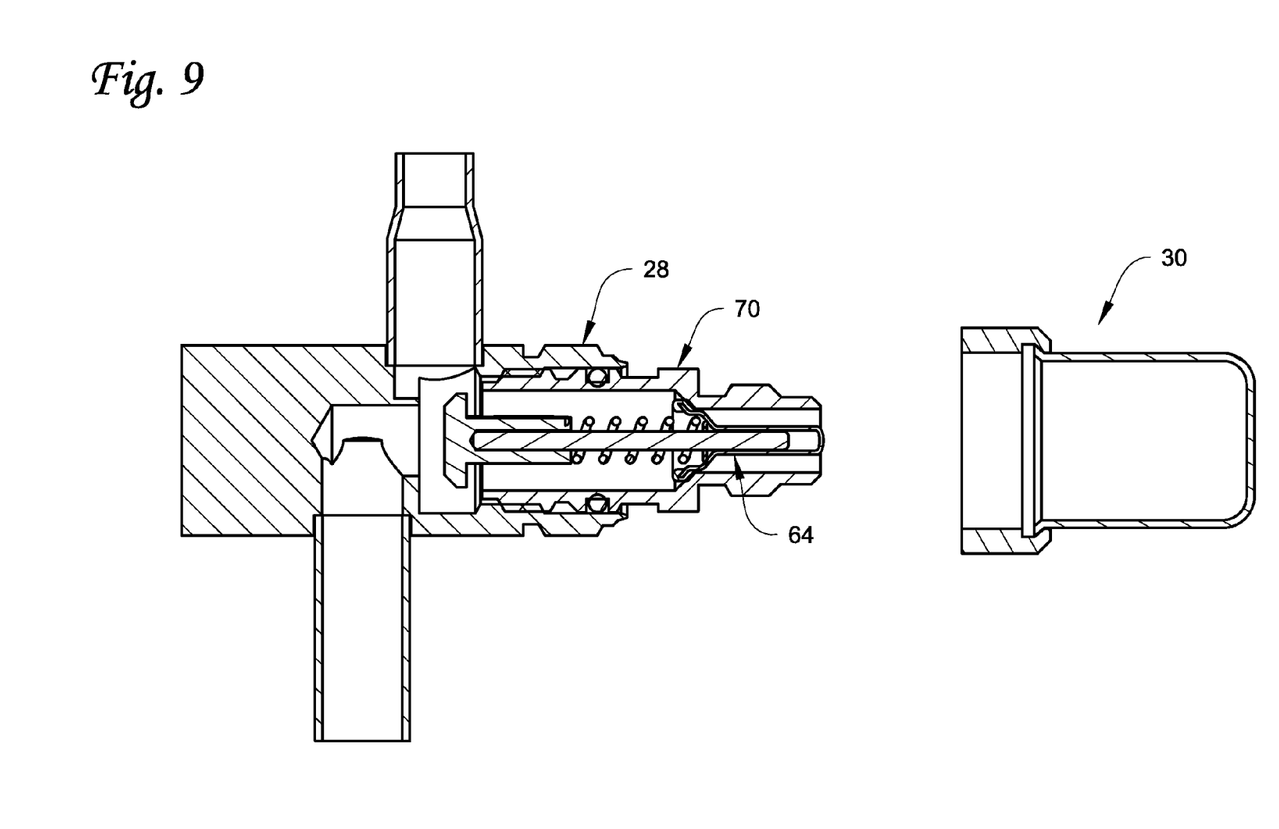
FIG. 9 is a view similar to FIG. 8 but showing the cap.

The piston body 70 is then actuated to move the piston body back out to the first position as illustrated in FIG. 8 which unseats the piston head from the flow port and allows the condenser side and the evaporator side to communicate with each other as shown by the flow path. The cap 30 can then be re-installed over the service port as indicated in FIG. 9 to seal the system.

For ongoing maintenance of the system, for example adding refrigerant, taking readings, etc, the cap 30 can be removed and the system can be accessed through the service port via the control valve 64. The service port is designed to interface with existing service connection tools, eliminating the need to purchase new service equipment.

Figure 10:
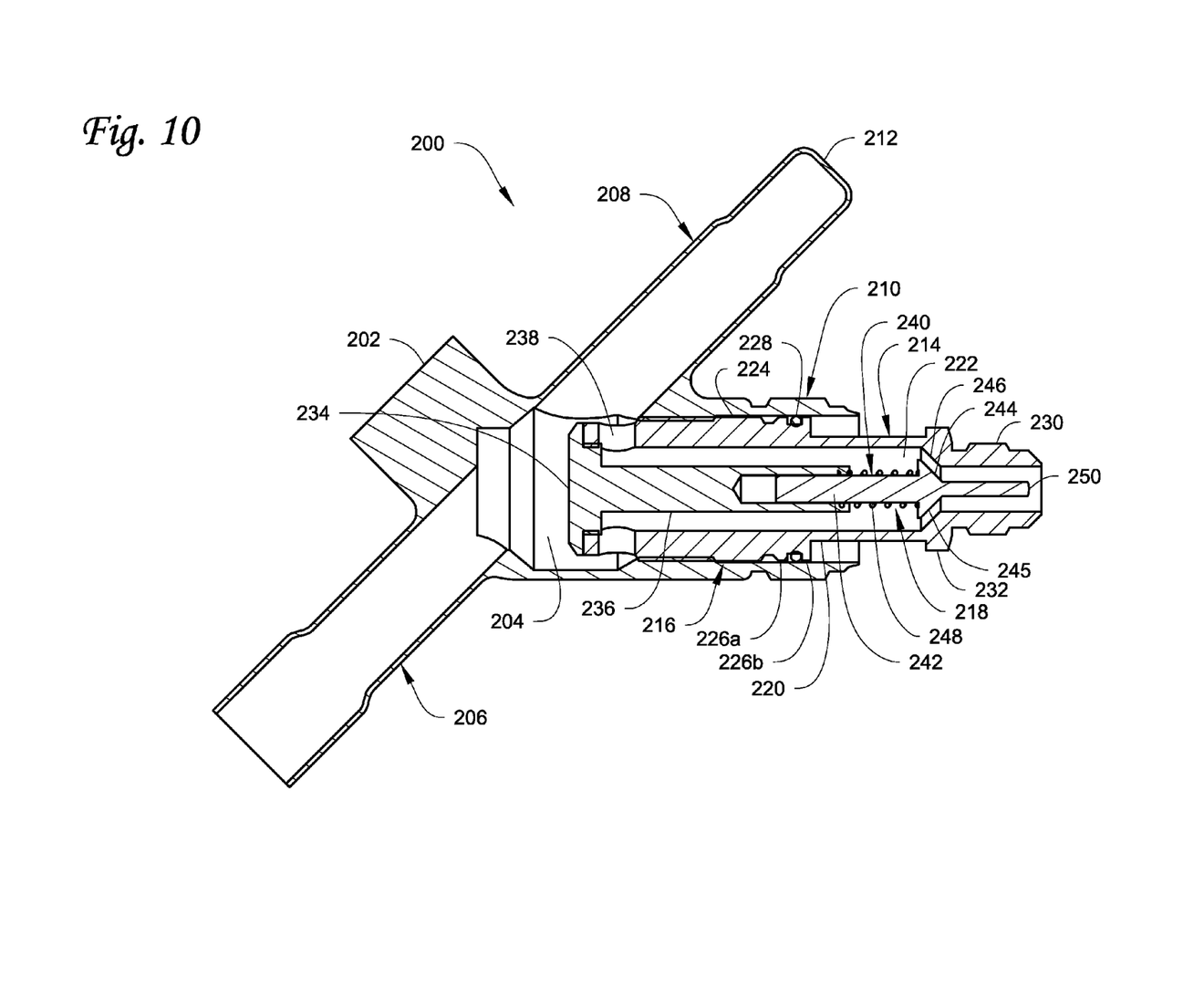
FIG. 10 is a view of an alternative embodiment of a service valve assembly with the shut-off valve open and the control valve open.
Figure 11:
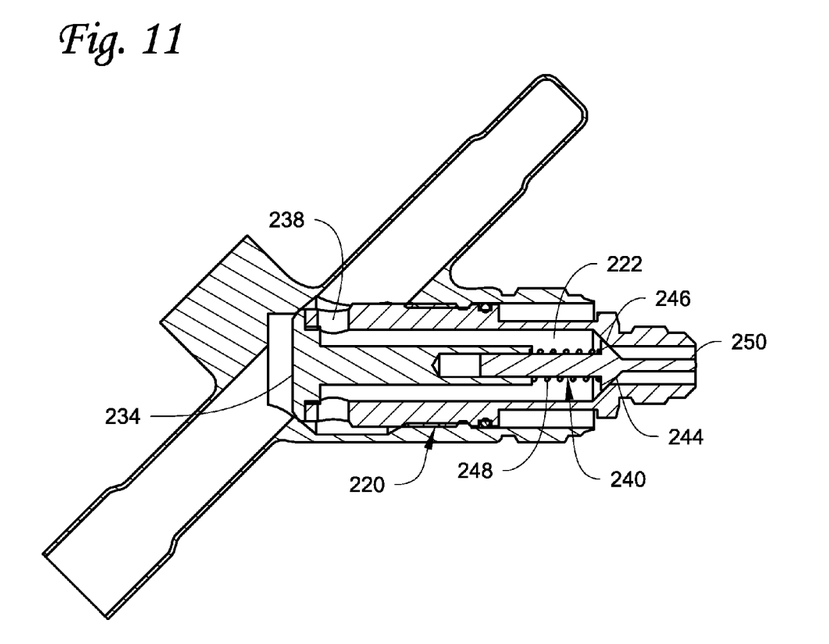
FIG. 11 is a view similar to FIG. 10 but with the shut-off valve closed and the control valve closed.
Figure 12:
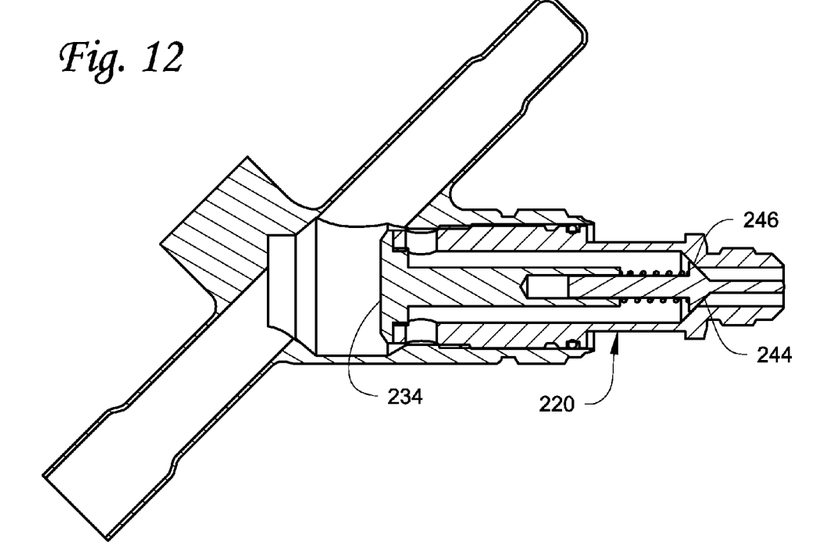
FIG. 12 is a view similar to FIG. 10 with the shut-off valve open and the control valve closed.

With reference to FIGS. 10-12, an alternative embodiment of a service valve assembly 200 is illustrated. The assembly 200 includes a housing 202 having a passageway 204, a condenser side port 206 in communication with the passageway for connection to the condenser unit, an evaporation side port 208 in communication with the passageway for connection to the evaporation unit, and a service port 210 in communication with the passageway. The evaporation side port 208 can have one or more steps similar to the valve assembly 20 of FIGS. 2-9.

In this embodiment, the condenser side port 206 and the evaporation side port 208 are integrally formed with the housing 202, for example from a one-piece forged construction. Further, the condenser side port 206 and the evaporation side port 208 are aligned with each other thereby providing a straight flow path. As with the valve assembly 20, the evaporation side port 208 initially has a closed end 212.

A valve unit 214 is disposed within the service port 210 and the passageway 204. The valve unit 214 controls flow through the housing 202 by controlling flow between the condenser side port 206, the service port 210, and the evaporation side port 208, as well as controlling flow through the service port. To accomplish these tasks, the valve unit 214 includes a shut-off valve 216 and a control valve 218.

The shut-off valve 216 is in the form of a piston valve with a piston body 220 having one end disposed within the service port and a second end extending from the housing. The piston body 220 is generally cylindrical and includes a central passageway 222 extending from one end to the other end.

The exterior of the piston body 220 includes a first threaded section 224 that engages with internal threads formed on the inside of the service port 210. The threaded section 224 permits the piston body to be screwed in and out of the service port, thereby adjusting the position of the piston body depending upon the desired flow path. A sealing groove formed between two shoulders 226a, 226b is also formed in the exterior of the piston body 220, and a seal 228 is disposed in the sealing groove. The seal 228 seals with the interior surface of the service port to prevent fluid leaks past the piston body.

The portion of the piston body 220 that extends from the housing includes a second threaded section 230 for connection with a standard service connection tool, and a hex surface 232 for engagement with a tool for rotating the piston body 220 to adjust the position thereof.

The piston body 220 also includes a piston head 234 at the first end thereof. The piston head 234 moves with the piston body 220 as the piston body 220 is actuated into and from the service port. A stem 236 extends from the piston head and a flow path is defined between the stem 236 and the interior of the piston body 220. Radial openings 238 are formed in the piston body 220 adjacent the head 234 to provide communication between the flow path and the exterior of the piston body.

The control valve 218 comprises a poppet 240 with a stem 242 that is slideably disposed within a channel in the stem 236 and a poppet head 244 having a diameter greater than the diameter of the stem 242. The poppet head 244 has an elastomeric seal 245 fixed to the surface thereof for sealing engagement with a sealing surface 246 on the inside of the piston body 220 formed by a reduced diameter section of the passageway 222.

A coil spring 248 is disposed around the stem 242 and has one end engaged with the end of the stem 236 and a second end engaged with the poppet head 244. The spring 248 normally biases the poppet head 244 into sealing engagement with the sealing surface 246 as shown in FIG. 11 preventing fluid flow through the passageway 222 and through the piston body 220. An extension stem 250 extends from the poppet head 244 into a position to be engaged by a pin or other suitable projection on a service connection tool, to an open position shown in FIG. 10 where the poppet head 244 is unseated from the sealing surface 246, allowing fluid flow through the piston body.

Assuming that the valve assembly 200 is installed to the condenser side, FIG. 10 shows the shut-off valve 216 at a first position that permits flow communication between the condenser side port and the service port, and with the control valve 218 at a second position that permits flow past the control valve and thereby permits flow through the service port. The stage shown in FIG. 10 is similar to the stage shown in FIG. 5 for the valve assembly 20.

Once the processing of the condenser side is completed, the process tooling is removed and the poppet 240 will be biased back to the closed position by the spring 248. The piston body 220 is then actuated into the housing by rotating the piston body until the piston head 234 reaches a second position where the piston head engages and seals with the interior of the housing as shown in FIG. 11. The piston head and the housing form a metal-to-metal seal that hermetically seals the system by preventing flow communication between the condenser side port and the evaporation side port and the service port. However, flow communication between the evaporation side port and the service port is permitted. Installing a cap similar to the cap 30 adds a secondary seal via a metal-to-metal seal between the cap and the service port to provide a leak-proof system.

When the condenser unit is ready for installation, the installer will cut-off the tube of the evaporation side port 208 at a diameter that is appropriate for the system. The now open end of the tube is attached to the evaporation side of the refrigeration system. The installer then connects to the service port 210 of the valve assembly 200 using a standard service connection tool. This opens the poppet and the installer processes the evaporation side of the system. Once processing is complete, the service connection tool is removed, and the poppet is biased back to the closed position.

The piston body 220 is then actuated to move the piston body back out to the first position as illustrated in FIG. 12 which unseats the piston head and allows the condenser side and the evaporator side to communicate with each other. The cap can then be re-installed over the service port to seal the system.

For ongoing maintenance of the system, for example adding refrigerant, taking readings, etc, the cap can be removed and the system can be accessed through the service port via the control valve. The service port is designed to interface with existing service connection tools, eliminating the need to purchase new service equipment.

FIGS. 13-16 illustrate another alternative embodiment of a service valve assembly 300 that uses a ball valve as a shut-off valve. The assembly 300 includes a housing 302 having a passageway 304, a condenser side port 306 in communication with the passageway for connection to the condenser unit, an evaporation side port 308 in communication with the passageway for connection to the evaporation unit, and a service port 310 in communication with the passageway. The evaporation side port 308 can have one or more steps similar to the valve assembly 20 of FIGS. 2-9.

In this embodiment, the condenser side port 306 and the evaporation side port 308 are aligned with each other thereby providing a straight flow path. The evaporation side port 308 can have a closed end, or as shown in FIG. 13, the end can be open.

A valve unit 312 is disposed within the service port 310 and the passageway 304. The valve unit 312 controls flow through the housing 302 by controlling flow between the condenser side port 306, the service port 310, and the evaporation side port 308, as well as controlling flow through the service port. To accomplish these tasks, the valve unit 312 includes a shut-off valve 316 and a control valve 318.

Figure 13:
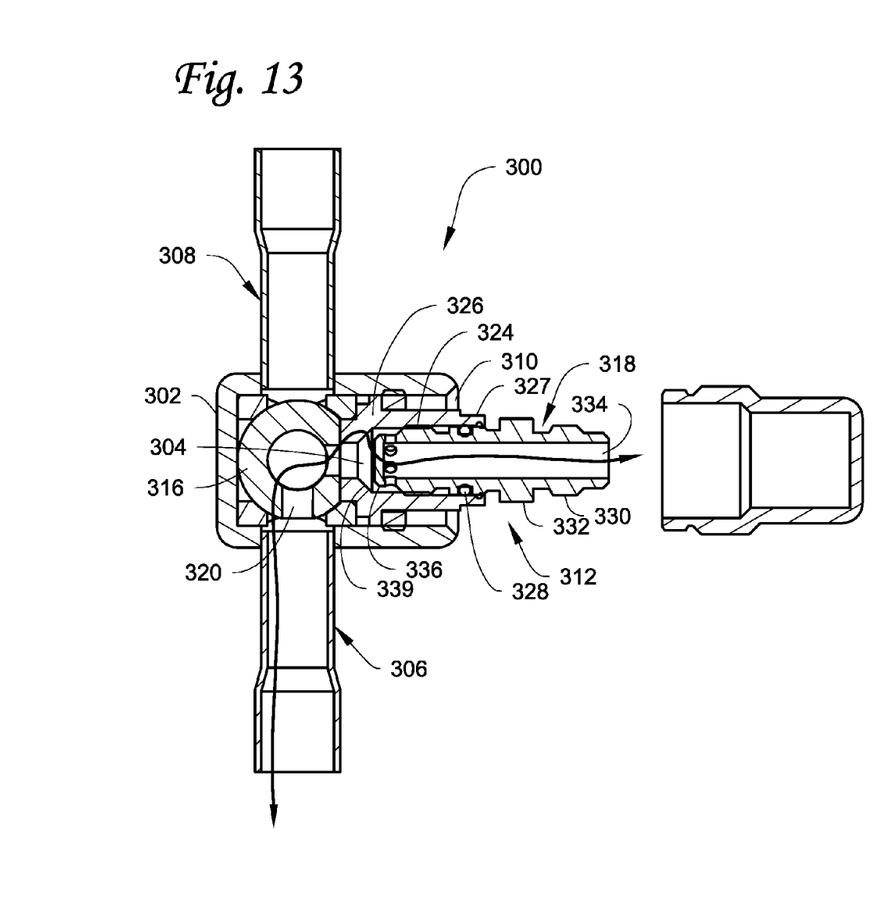
FIG. 13 is a view of an alternative embodiment of a service valve assembly with the shut-off valve open and the control valve open.
Figure 14:
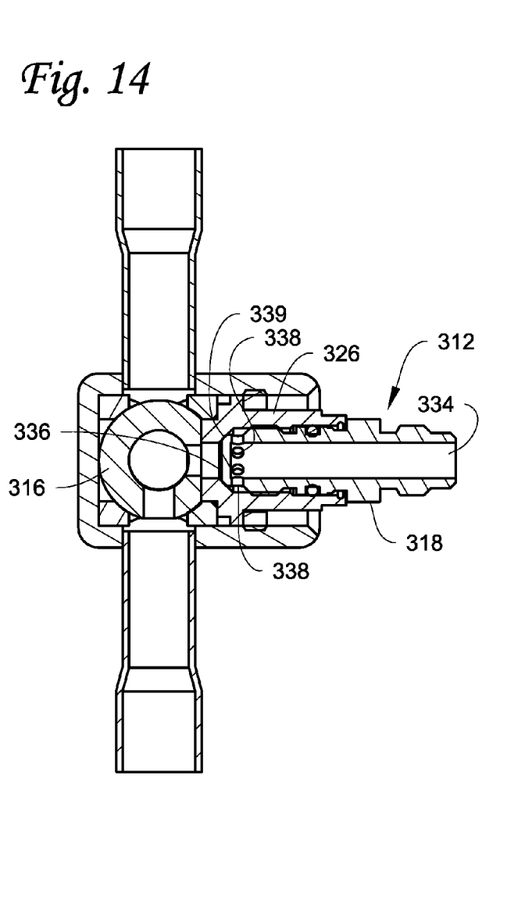
FIG. 14 is a view similar to FIG. 13 but with the control valve closed.
Figure 15:
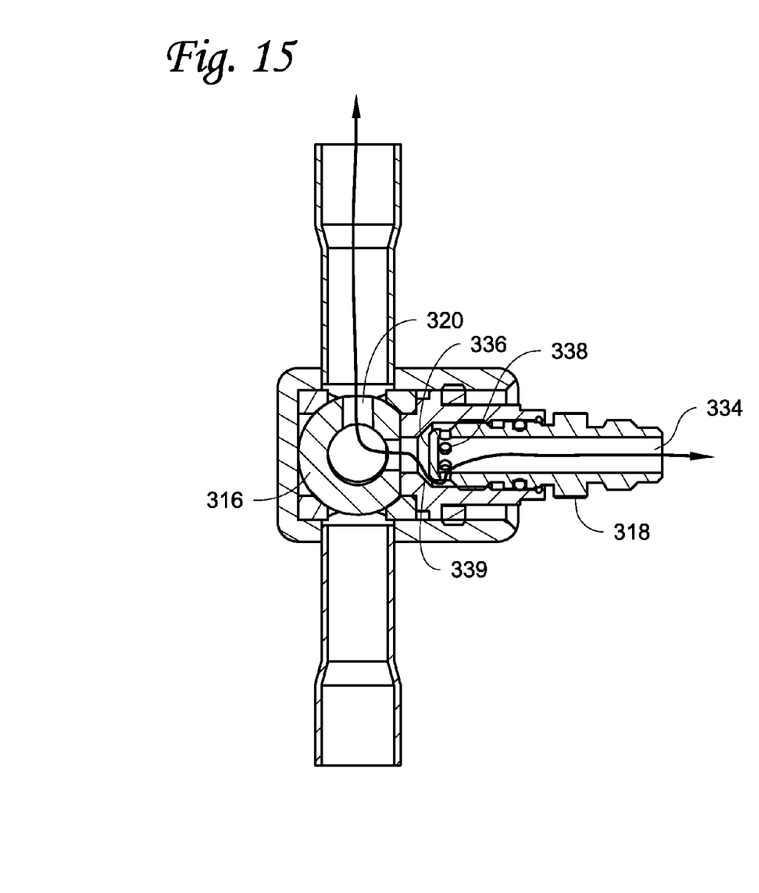
FIG. 15 is a view similar to FIG. 13 with the shut-off valve at a second position and the control valve open.
Figure 16:
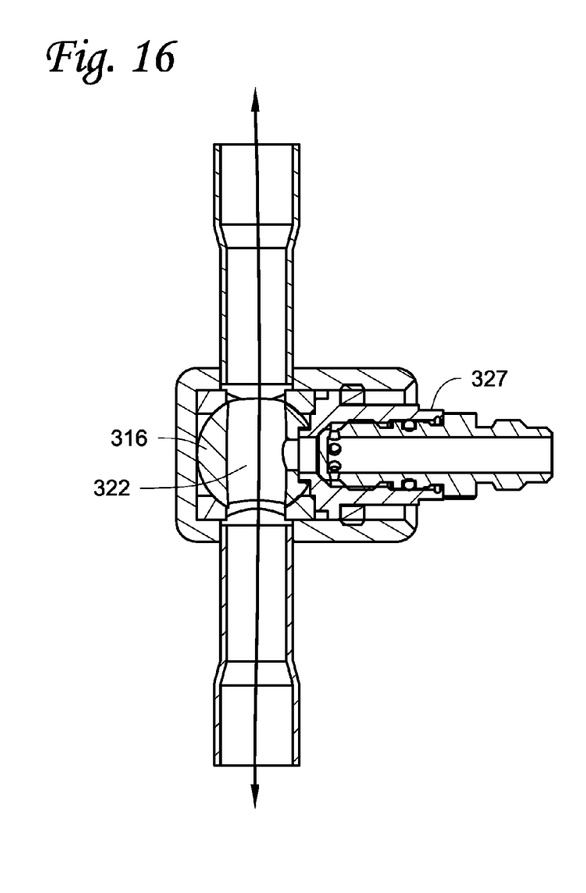
FIG. 16 is a view similar to FIG. 13 showing a flow path between the condenser side port and the evaporation side port and the control valve closed.

The shut-off valve 316 is in the form of a ball valve with a right angle flow path 320 as shown in FIGS. 13-15 and a straight flow path 322 as shown in FIG. 16. The ball valve is fixed to a sleeve 326 that is rotatably disposed within the housing such that rotation of the sleeve 326 causes rotation of the ball valve. The sleeve 326 includes flats 327 at the end thereof for engagement with a tool for rotating the sleeve 326.

The control valve 318 is in the form of a piston that includes a first threaded section 324 that engages with internal threads formed on the inside of a sleeve 326 disposed within the service port 310. The threaded section 324 permits the control valve piston to be screwed in and out to adjust the position of the piston. A sealing groove formed between two shoulders is also formed in the exterior of the control valve 318, and a seal 328 is disposed in the sealing groove. The seal 328 seals with the interior surface of the sleeve 326 to prevent fluid leaks past the piston body.

The portion of the control valve 318 that extends from the housing includes a second threaded section 330 for connection with a standard service connection tool, and a hex surface 332 for engagement with a tool for rotating the control valve 318 to adjust the position thereof.

The control valve 318 is generally hollow with an open end 334, defining an internal flow path. The opposite end of the control valve 318 defines a piston head 336. Radial openings 338 are formed in the control valve 318 adjacent the head 336 to provide communication between the internal flow path and the exterior. The piston head 336 is designed to form a metal-to-metal seal with a sealing surface 339 on the inside of the sleeve 326.

Operation of the valve assembly 300 is as follows. Assuming that the valve assembly 300 is installed to the condenser side, FIG. 13 shows the shut-off valve 316 at a first position that permits flow communication between the condenser side port and the service port, and with the control valve 318 at a second position that permits flow past the control valve and thereby permits flow through the service port. The stage shown in FIG. 13 is similar to the stage shown in FIG. 5 for the valve assembly 20.

Once the processing of the condenser side is completed, the sleeve 326, which is fixed to the shut-off valve 316, is rotated so that the right angle flow path 320 connects the evaporation side and the service port as shown in FIG. 15. The process tooling is then removed. The control valve 318 is then actuated into the housing by rotating the valve 318 until the piston head 336 reaches a position where the piston head engages and seals with the sealing surface 339 as shown in FIG. 14. The piston head and the sealing surface forms a metal-to-metal seal sealing the system by preventing flow communication between the condenser side port and the evaporation side port and the service port. Alternatively, the control valve 318 can first be actuated to seal with the surface 339 as shown in FIG. 14, followed by rotation of the sleeve and shut-off valve to the position shown in FIG. 15.

Installing a cap similar to the cap 30 adds a secondary seal via a metal-to-metal seal between the cap and the service port to provide a leak-proof system. The cap can include threads on the outer diameter that engage with inner diameter threads on the housing 302, and can include a metal to metal seal like the cap 30. Alternatively, the cap can include inner diameter threads that engage with outer diameter threads on the housing, as well as a metal-to-metal seal with the housing like the cap 30.

When the condenser unit is ready for installation, the evaporation side port 308 is attached to the evaporation side of the refrigeration system. The control valve 318 is then actuated out to unseat the piston head 336 from the sealing surface 339, thereby placing the evaporation side in communication with the service port. The installer then connects to the service port and processes the evaporation side of the system. Once processing is complete, the ball valve is then rotated so that the straight flow path 322 places the condenser side and the evaporator side in direct communication with each other as shown in FIG. 16. The control valve is threaded into the housing to engage the piston head with the sealing surface and the service connection tool is removed.

The cap can then be re-installed over the service port to seal the system.

For ongoing maintenance of the system, for example adding refrigerant, taking readings, etc, the cap can be removed and the system can be accessed through the service port via the control valve 318. The service port is designed to interface with existing service connection tools, eliminating the need to purchase new service equipment.

The described and illustrated features of the valve assembly 20, the valve assembly 200 and the valve assembly 300 are useable together in a multitude of combinations. For example, the steps 42 on the evaporation side tube described for the valve assembly 20 can be used on the valve assembly 300. Other combinations of features not specifically mentioned are contemplated and possible.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A service valve assembly for a refrigeration system that includes a condenser unit and an evaporation unit, comprising:
    a housing having a passageway, a condenser side port in communication with the passageway for connection to the condenser unit, an evaporation side port in communication with the passageway for connection to the evaporation unit, and a service port in communication with the passageway;
    a valve seat in the passageway between the condenser side port and the evaporation side port,
    a valve unit disposed within the passageway of the housing, the valve unit including a shut-off valve and a control valve,
    the shut-off valve controls flow through the housing and has a first position that permits flow communication between the condenser side port and the service port, and a second position that prevents flow communication between the condenser side port and the evaporation side port and the service port but permits flow communication between the evaporation side port and the service port,
    the shut-off valve includes a shut-off end and a service end that extends through and beyond the service port, the shut-off end includes a head that is in sealing engagement with the valve seat and prevents flow past the valve seat at the second position, and
    the control valve controls flow through the service port and has a first position preventing flow past the control valve and thereby preventing flow through the service port, and a second position that permits flow past the control valve and thereby permits flow through the service port.

2. The service valve assembly of claim 1, wherein the evaporation side port comprises a tube having a first end that is fixed to the housing and a second end opposite the first end, the second end being closed.

3. The service valve assembly of claim 2, wherein the tube is formed with at least one step.

4. The service valve assembly of claim 1, wherein the shut-off valve comprises a piston valve.

5. The service valve assembly of claim 4, wherein the control valve comprises a spring-biased poppet valve with an elastomeric seal.

6. The service valve assembly of claim 5, wherein the elastomeric seal of the spring-biased poppet valve seals with an interior surface of the piston valve.

7. The service valve assembly of claim 1, wherein the control valve comprises a spring-biased poppet valve.

8. The service valve assembly of claim 1, wherein the condenser side port and the evaporation side port are parallel to each other, and the service port has an axis that is disposed at an angle of about 90 degrees or less relative to one of the condenser side port and the evaporation side port.

9. The service valve assembly of claim 1, wherein the housing includes an exterior thread adjacent the service port, and further comprising a cap with an interior thread that is engageable with the exterior thread of the housing to secure the cap over the service port.

10. A service valve assembly for a refrigeration system that includes a condenser unit and an evaporation unit, comprising:
    a housing having a passageway, a condenser side tube in communication with the passageway for connection to the condenser unit, an evaporation side tube in communication with the passageway for connection to the evaporation unit, and a service port in communication with the passageway;
    a valve seat in the passageway;
    the evaporation side tube has a first end that is fixed to the housing and a second end opposite the first end, the second end being closed, and the evaporation side tube is formed with at least one step;
    a valve unit disposed within the passageway of the housing, the valve unit including a shut-off valve and a control valve,
    the shut-off valve has one position that permits flow communication between the condenser side tube, the evaporation side tube, and the service port, and another position that prevents flow communication between the condenser side tube and the evaporation side tube and the service port but permits flow communication between the evaporation side tube and the service port,
    the shut-off valve includes a shut-off end and a service end that extends through and beyond the service port, the shut-off end includes a head that is in sealing engagement with the valve seat and prevents flow past the valve seat at the another position, and
    the control valve controls flow through the service port and has a first position preventing flow past the control valve and thereby preventing flow through the service port, and a second position that permits flow past the control valve and thereby permits flow through the service port.

11. The service valve assembly of claim 10, wherein the shut-off valve comprises a piston valve.

12. The service valve assembly of claim 11, wherein the control valve comprises a spring-biased poppet valve with an elastomeric seal.

13. The service valve assembly of claim 10, wherein the control valve comprises a spring-biased poppet valve.

14. The service valve assembly of claim 10, wherein the condenser side tube and the evaporation side tube are parallel to each other, and the service port has an axis that is disposed at an angle of about 90 degrees or less relative to one of the condenser side tube and the evaporation side tube.

15. The service valve assembly of claim 10, wherein the housing includes an exterior thread adjacent the service port, and further comprising a cap with an interior thread that is engageable with the exterior thread of the housing to secure the cap over the service port.

16. A service valve assembly for a refrigeration system that includes a condenser unit and an evaporation unit, comprising:
a housing having a passageway, a condenser side port in communication with the passageway for connection to the condenser unit, an evaporation side port in communication with the passageway for connection to the evaporation unit, and a service port in communication with the passageway;
a valve seat in the passageway between the condenser side port and the evaporation side port;
a piston valve movably disposed within the passageway of the housing for movement between a first position at which fluid can flow past the valve seat and a second position at which fluid cannot flow past the valve seat, the piston valve includes a shut-off end between the condenser side port and the evaporation side port, and a service end that extends through and beyond the service port, the shut-off end includes a solid piston head that is sealable with the valve seat at the second position of the piston valve to seal with the valve seat and prevent flow past the valve seat;
the piston valve includes a control valve disposed therein adjacent to the service end;
the piston valve controls flow through the housing and is configured such that the first position of the piston valve permits flow communication between the condenser side port, the evaporation side port, and the service port, and the second position of the piston valve prevents flow communication between the condenser side port and the evaporation side port but permits flow communication between the evaporation side port and the service port, and
the control valve controls flow through the service port and has a first position preventing flow past the piston valve and thereby preventing flow through the service port, and a second position that permits flow past the piston valve and thereby permits flow through the service port.

17. The service valve assembly of claim 16, wherein the evaporation side port comprises a tube having a first end that is fixed to the housing and a second end opposite the first end, the second end being closed.

18. The service valve assembly of claim 17, wherein the tube is formed with at least one step.

19. The service valve assembly of claim 16, wherein the control valve comprises a spring-biased poppet valve.

20. The service valve assembly of claim 19, wherein the spring-biased poppet valve includes an elastomeric seal.

21. The service valve assembly of claim 20, wherein the elastomeric seal of the spring-biased poppet valve is positioned to seal with an interior surface of the piston valve.

22. The service valve assembly of claim 16, wherein the condenser side port and the evaporation side port are parallel to each other, and the service port has an axis that is disposed at an angle of about 90 degrees or less relative to one of the condenser side port and the evaporation side port.

23. The service valve assembly of claim 16, wherein the housing includes an exterior thread adjacent the service port, and further comprising a cap with an interior thread that is engageable with the exterior thread of the housing to secure the cap over the service port.

24. The service valve assembly of claim 16, wherein the control valve extends through and beyond the service port.

* * * * *